United States Patent
Farajidana et al.

(10) Patent No.: US 8,964,657 B2
(45) Date of Patent: Feb. 24, 2015

(54) APPARATUS AND METHOD FOR JOINT ENCODING OF USER SPECIFIC REFERENCE SIGNAL INFORMATION IN WIRELESS COMMUNICATION

(75) Inventors: Amir Farajidana, Sunnyvale, CA (US); Alexei Yurievitch Gorokhov, San Diego, CA (US); Juan Montojo, San Diego, CA (US); Stefan Geirhofer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 858 days.

(21) Appl. No.: 12/917,397

(22) Filed: Nov. 1, 2010

(65) Prior Publication Data

US 2011/0268050 A1     Nov. 3, 2011

Related U.S. Application Data

(60) Provisional application No. 61/257,376, filed on Nov. 2, 2009.

(51) Int. Cl.
| | |
|---|---|
| *H04W 4/00* | (2009.01) |
| *H04L 25/02* | (2006.01) |
| *H04L 5/00* | (2006.01) |
| *H04L 1/00* | (2006.01) |

(52) U.S. Cl.
CPC .......... *H04L 5/0051* (2013.01); *H04L 25/0226* (2013.01); *H04L 1/004* (2013.01)
USPC ......................................... 370/329; 455/450

(58) Field of Classification Search
None
See application file for complete search history.

(56) References Cited

U.S. PATENT DOCUMENTS

| | | | |
|---|---|---|---|
| 8,009,617 B2 | 8/2011 | Sarkar et al. | |
| 2009/0041140 A1 | 2/2009 | Xiao et al. | |
| 2009/0067391 A1 | 3/2009 | Shen et al. | |
| 2009/0109873 A1 | 4/2009 | Shen et al. | |
| 2010/0091678 A1* | 4/2010 | Chen et al. | 370/252 |
| 2010/0165930 A1* | 7/2010 | Zangi | 370/329 |
| 2010/0195748 A1* | 8/2010 | Nam et al. | 375/260 |
| 2012/0213167 A1* | 8/2012 | Xu et al. | 370/329 |

FOREIGN PATENT DOCUMENTS

| | | |
|---|---|---|
| CN | 101369872 A | 2/2009 |
| EP | 2099232 A1 | 9/2009 |
| JP | 2012514933 A | 6/2012 |
| WO | WO-2008131352 A1 | 10/2008 |

(Continued)

OTHER PUBLICATIONS

International Search Report and Written Opinion—PCT/US2010/055159, ISA/EPO—Jul. 8, 2011.

(Continued)

*Primary Examiner* — Brian Roberts
(74) *Attorney, Agent, or Firm* — Liem T. Do (57) ABSTRACT

An apparatus and method for providing encoded information pertaining to a user-specific reference signal associated with a user equipment in a multiple access wireless communication system are provided. The encoded information jointly indicates a rank of transmission together with at least one parameter relating to the user-specific reference signal, such as a set of antenna ports and a user-specific reference signal pattern. The encoded information is transmitted in a downlink control channel to reduce overhead in the channel.

64 Claims, 5 Drawing Sheets

(56) References Cited

FOREIGN PATENT DOCUMENTS

| WO | 2009023863 A1 | 2/2009 |
| WO | WO-2010090442 A2 | 8/2010 |

OTHER PUBLICATIONS

Texas Instruments, "CQI, PMI, and Rank Reports for E-UTRA", 3GPP Draft, R1-080712 TI MIMO Feedback, 3rd Generation Partnership Project (3GPP), Mobile Competence Centre, 650, Route Des Lucioles, F-06921 Sophia-Antipolis Cedex, France, vol. RAN WGI, no. Sorrento, Italy, Feb. 6, 2008, XP050109205.

Nokia Siemens Networks et al., Considerations on Initialization and Mapping of DM-RS Sequence, 3GPP Draft, R1-093304, 3rd Generation Partnership Project (3GPP), Mobile Competence Centre, 650, Route des Lucioles, F-06921 Sophia-Antipolis Cedex, France, no. Shenzhen, China, Aug. 19, 2009, XP050351628.

Taiwan Search Report—TW099137661—TIPO—Feb. 18, 2014.

* cited by examiner

UE-RS Pattern A
(Rank 2)

UE-RS Pattern B
(Rank 4)

APPARATUS AND METHOD FOR JOINT ENCODING OF USER SPECIFIC REFERENCE SIGNAL INFORMATION IN WIRELESS COMMUNICATION

CROSS REFERENCE TO RELATED APPLICATIONS

This application claims priority to U.S. Provisional Patent Application No. 61/257,376, filed on Nov. 2, 2009, herein incorporated by reference in its entirety.

FIELD

This application relates generally to multiple-access wireless communications. More particularly, but not exclusively, this application relates to techniques for encoding user-specific reference signal information in a multiple-access wireless communication system.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access ("CDMA") systems, time division multiple access ("TDMA") systems, frequency division multiple access ("FDMA") systems, 3GPP Long Term Evolution ("LTE") systems, and orthogonal frequency division multiple access ("OFDMA") systems.

Generally, a wireless multiple-access communication system can simultaneously support communications for multiple wireless terminals. Each terminal communicates with one or more base stations via transmissions on the forward and reverse links. The forward link (or downlink) refers to the communications link from the base stations to the terminals, and the reverse link (or uplink) refers to the communications link from the terminals to the base stations. This communications link may be established via a single-in-single-out, multiple-in-signal-out, or a multiple-in-multiple-out ("MIMO") system.

A MIMO system employs multiple ("$N_T$") transmit antennas and multiple ("$N_R$") receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports both time division duplex ("TDD") and frequency division duplex ("FDD") systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Generally, wireless cellular communication networks incorporate a number of mobile user equipments ("UEs") and a number of base nodes ("NodeBs"). A NodeB is generally a fixed station, and may also be called a base transceiver system ("BTS"), an access point ("AP"), a base station ("BS"), or some other equivalent terminology. As improvements to networks are made, the NodeB functionality has evolved, so a NodeB is sometimes also referred to as an evolved NodeB ("eNB"). In general, NodeB hardware, when deployed, is fixed and stationary, while UE hardware is portable.

In contrast to a NodeB, a mobile UE can comprise portable hardware. A UE, also commonly referred to as a terminal or a mobile station, may be a fixed or mobile device, and may be a wireless device, a cellular phone, a personal digital assistant ("PDA"), a wireless modem card, and so on. Uplink communication ("UL") refers to a communication from a mobile UE to a NodeB, whereas downlink ("DL") refers to a communication from a NodeB to a mobile UE.

Each NodeB contains radio frequency transmitter(s) and the receiver(s) used to communicate directly with the mobile UEs, which move freely around it. Similarly, each mobile UE contains radio frequency transmitter(s) and receiver(s) used to communicate directly with a NodeB. In cellular networks, the mobile UEs cannot communicate directly with each other but have to communicate with the NodeB.

A reference signal ("RS") is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as Demodulation RS or DM-RS. Note that a RS can also be transmitted for other purposes, such as channel sounding (sounding reference signal or "SRS"), synchronization, or any other purpose. Also note that a RS can sometimes be called a pilot signal, a training signal, or any other equivalent term.

In many modern communication systems, the DM-RS may be specific to a UE (herein referred to as a "UE-RS", or User-Equipment Specific Reference Signal). For example, Releases 9 and 10 of LTE rely on UE-RSs for demodulation. Different spatial processing techniques are considered in newer releases of LTE, such as single-user MIMO ("SU-MIMO") with up to eight layers of transmission, and multi-user MIMO ("MU-MIMO") operation that is cooperative and coordinated across multiple cells and nodes in the network. The cooperation can be at the level of beam coordination where the transmission point for each user is still in one cell, or it can be at the level of joint transmission where the data packet for a particular UE is transmitted from multiple cells. UE-RSs are instrumental in enabling efficient operation under these different spatial processing techniques.

Further, UE-RSs provide UEs with a local channel estimate among the resources assigned to the UE and are treated as being transmitted using a distinct antenna port with its own channel response. A typical usage of a UE-RS is to enable beamforming of the data transmissions to specific UEs. For example, rather than using the physical antennas used for transmission of the other (cell-specific) antenna ports, the eNodeB may use a correlated array of physical antenna elements to generate a narrow beam in the direction of a particular UE. Such a beam may experience a different channel response between the eNodeB and the UE, thus requiring the use of UE-specific RSs to enable the UE to demodulate the beamformed data coherently.

In order for the UE to be able to carry out the demodulation and decoding of the transmitted data, UE-RS information needs to be conveyed to the UE. Such information enables the UE with knowing the resource elements ("REs") used for data symbols, performing channel and interference estimation, among other procedures. What is needed, therefore, is a way to efficiently transmit UE-RS information to a UE. The present application addresses this issue.

SUMMARY

This disclosure relates generally to apparatus and methods for encoding user-specific reference signal information in a multiple-access wireless communication system. The information may include, for example, an indication of a user-specific reference signal pattern, a rank of transmission, and a set of antenna ports. The encoded information is transmitted in a downlink control channel to reduce overhead in the channel.

In one aspect, this disclosure relates to a method that facilitates providing encoded information pertaining to a user-specific reference signal associated with a user equipment. A bit sequence is included within the encoded information to provide at least an indication of a transmission rank jointly with at least one parameter relating to the user-specific reference signal. The encoded information is transmitted within a payload of a downlink control channel.

In another aspect, this disclosure relates to a method for wireless communications. Encoded information pertaining to a user-specific reference signal associated with a user equipment is received on a downlink control channel. The encoded information includes a bit sequence that encodes at least an indication of a transmission rank jointly with at least one parameter relating to the user-specific reference signal. The encoded information is decoded at the user equipment.

In yet another aspect, this disclosure relates to an apparatus for wireless communications. The apparatus includes means for selecting a user-specific reference signal parameter, means for jointly encoding the selected user-specific reference signal parameter with at least one associated user-specific reference signal parameter, and means for transmitting the jointly encoded user-specific reference signal parameters in a downlink control channel to a user equipment associated with the user-specific reference signal.

In yet another aspect, this disclosure relates to an apparatus for wireless communications. The apparatus includes means for receiving, on a downlink control channel, encoded information pertaining to a user-specific reference signal associated with a UE, wherein the encoded information includes a bit sequence that encodes at least an indication of a transmission rank jointly with at least one parameter relating to the user-specific reference signal; and means for decoding the encoded information.

In yet another aspect, this disclosure relates to an apparatus for wireless communications. The apparatus includes a processor that is configured to: receive, on a downlink control channel, encoded information pertaining to a user-specific reference signal associated with a UE, wherein the encoded information includes a bit sequence that encodes at least an indication of a transmission rank jointly with at least one parameter relating to the user-specific reference signal; and decode the encoded information.

In a further aspect, this disclosure relates to a computer program product for use in a wireless communications system and including a computer-readable storage medium. The computer-readable storage medium comprises instructions for causing at least one computer to select a rank of transmission, instructions for causing the at least one computer to associate the selected rank with at least one parameter pertaining to a user-specific reference signal, and instructions for causing the at least one computer to provide a joint indication of the rank and the at least one parameter to reduce overhead in a downlink control channel.

In another aspect, this disclosure relates to an apparatus that facilitates providing encoded information pertaining to a user-specific reference signal associated with a user equipment. The apparatus includes a processor that is configured to include, within the encoded information, a bit sequence that encodes at least an indication of a transmission rank jointly with at least one parameter relating to the user-specific reference signal and to transmit the encoded information within a payload of a downlink control channel.

In yet another aspect, this disclosure relates to a computer program product that facilitates providing encoded information pertaining to a user-specific reference signal associated with a user equipment and including a computer-readable storage medium. The computer-readable storage medium comprises instructions for causing at least one computer to include within the encoded information, a bit sequence that encodes at least an indication of a transmission rank jointly with at least one parameter relating to the user-specific reference signal, and instructions for causing the at least one computer to transmit the encoded information within a payload of a downlink control channel.

In a further aspect, this disclosure relates to a method that facilitates providing encoded information pertaining to a user-specific reference signal associated with a user equipment (UE). A rank of transmission is selected. The selected rank of transmission is associated with at least one parameter pertaining to a user-specific reference signal (UE-RS). A set of scheduling constraints is provided to reduce signaling overhead in a downlink control channel. A joint indication of the rank and the at least one parameter is then transmitted in a downlink control channel subject to the set of scheduling constraints.

In a further aspect, this disclosure relates to an apparatus that facilitates providing encoded information pertaining to a user-specific reference signal associated with a user equipment (UE). The apparatus includes means for selecting a rank of transmission; means for associating the rank of transmission with at least one parameter pertaining to a user-specific reference signal (UE-RS); means for providing, subject to a set of scheduling constraints, a joint indication of the rank and the at least one parameter wherein the set of scheduling constraints are chosen to reduce overhead in a downlink control channel; and means for transmitting the joint indication within the downlink control channel.

In another aspect, this disclosure relates to a method that facilitates wireless communication at a user equipment (UE). The method includes receiving a joint indication of at least one parameter pertaining to a user-specific reference signal (UE-RS) and of at least one scheduling parameter; and performing channel or interference estimation based at least in part upon the at least one scheduling parameter.

In another aspect, this disclosure relates to an apparatus that facilitates wireless communication at a user equipment (UE). The apparatus includes means for receiving a joint indication of at least one parameter pertaining to a user-specific reference signal (UE-RS) and of at least one scheduling parameter; and means for performing channel or interference estimation based at least in part upon the at least one scheduling parameter.

The disclosure further relates to computer program products, devices, apparatus, and system for implementing the above-described methods, as well as others described herein.

Various additional aspects are further described below in conjunction with the appended drawings.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Apparatuses and methods are disclosed to facilitate wireless communications. The apparatuses and methods may include selecting one or more UE-RS parameters associated with a UE-RS for a given UE at a transmitting node, jointly encoding the UE-RS parameters to reduce overhead, transmitting the encoded information to the UE, decoding the encoded information at the UE to derive the UE-RS parameters, and using the derived UR-RS parameters to perform channel and interference estimation, among other procedures.

In various embodiments, the techniques described herein may be used for various wireless communication networks such as Code Division Multiple Access ("CDMA") networks, Time Division Multiple Access ("TDMA") networks, Frequency Division Multiple Access ("FDMA") networks, Orthogonal FDMA ("OFDMA") networks, Single-Carrier FDMA ("SC-FDMA") networks, as well as other communication networks. As described herein, the terms "networks" and "systems" are often used interchangeably.

A CDMA network may implement a radio technology such as Universal Terrestrial Radio Access ("UTRA"), CDMA2000, and the like. UTRA includes Wideband-CDMA ("W-CDMA") and Low Chip Rate ("LCR"). CDMA2000 covers IS-2000, IS-95 and IS-856 standards. A TDMA network may implement a radio technology such as Global System for Mobile Communications ("GSM").

An OFDMA network may implement a radio technology such as Evolved UTRA ("E-UTRA"), IEEE 802.11, IEEE 802.16, IEEE 802.20, Flash-OFDM, and the like. UTRA, E-UTRA, and GSM are part of Universal Mobile Telecommunication System ("UMTS"). In particular, Long Term Evolution ("LTE") is an upcoming release of UMTS that uses E-UTRA. UTRA, E-UTRA, GSM, UMTS and LTE are described in documents from an organization named "3rd Generation Partnership Project" ("3GPP"), and CDMA2000 is described in documents from an organization named "3rd Generation Partnership Project 2" (3GPP2).

These various radio technologies and standards are known in the art. For clarity, certain aspects of the apparatus and methods are described below for LTE, and LTE terminology is used in much of the description below; however, the description is not intended to be limited to LTE applications. Accordingly, it is appreciated by one of skill in the art that the apparatus and methods described herein may be applied to various communications systems and applications.

Single carrier frequency division multiple access ("SC-FDMA"), which utilizes single carrier modulation and frequency domain equalization is one communications technique of interest. SC-FDMA has a similar performance and essentially the same overall complexity as OFDMA. However, an SC-FDMA signal has a lower peak-to-average power ratio ("PAPR") than an OFDMA signal because of its inherent single carrier structure. As a result, SC-FDMA has drawn great attention recently, especially for uplink communications where lower PAPR greatly benefits the mobile terminal in terms of transmit power efficiency. Use of SC-FDMA is currently a working assumption for uplink multiple access schemes in 3GPP Long Term Evolution ("LTE"), or E-UTRA.

Logical channels in wireless communications systems may be classified into Control Channels and Traffic Channels. Logical Control Channels may comprise a Broadcast Control Channel ("BCCH") which is a downlink ("DL") channel for broadcasting system control information, a Paging Control Channel ("PCCH") which is a DL channel that transfers paging information, and a Multicast Control Channel ("MCCH") which is a Point-to-multipoint DL channel used for transmitting Multimedia Broadcast and Multicast Service ("MBMS") scheduling and control information for one or several Multicast Traffic Channel(s) ("MTCHs"). Generally, after establishing a Radio Resource Control ("RCC") connection, this channel is only used by UEs that receive MBMS. Further, a Dedicated Control Channel ("DCCH") is a Point-to-point bi-directional channel that transmits dedicated control information and is used by UEs having an RRC connection.

Logical Traffic Channels may comprise a Dedicated Traffic Channel ("DTCH") which is a Point-to-point bi-directional channel, dedicated to one UE, for the transfer of user information, and a MTCH, which is a point-to-multipoint DL channel for transmitting traffic data.

Transport Channels may be classified into Downlink ("DL") and Uplink ("UL"). DL Transport Channels may comprise a Broadcast Channel ("BCH"), a Downlink Shared Data Channel ("DL-SDCH"), and a Paging Channel ("PCH"). The PCH may be used for support of UE power saving (e.g., when a DRX cycle is indicated by the network to the UE), broadcasted over entire cell and mapped to physical layer ("PHY") resources which can be used for other control/traffic channels. The UL Transport Channels may comprise a Random Access Channel ("RACH"), a Request Channel ("REQCH"), an Uplink Shared Data Channel ("UL-SDCH"), and a plurality of PHY channels. The PHY channels may comprise a set of DL channels and UL channels.

In addition, the DL PHY channels may comprise the following channels:
 Common Pilot Channel ("CPICH")
 Synchronization Channel ("SCH")
 Common Control Channel ("CCCH")
 Shared DL Control Channel ("SDCCH")
 Multicast Control Channel ("MCCH")
 Shared UL Assignment Channel ("SUACH")
 Acknowledgement Channel ("ACKCH")
 DL Physical Shared Data Channel ("DL-PSDCH")
 UL Power Control Channel ("UPCCH")
 Paging Indicator Channel ("PICH")
 Load Indicator Channel ("LICH")
The UL PHY channels may in turn comprise the following set of channels:
 Physical Random Access Channel ("PRACH")

Channel Quality Indicator Channel ("CQICH")
Acknowledgement Channel ("ACKCH")
Antenna Subset Indicator Channel ("ASICH")
Shared Request Channel ("SREQCH")
UL Physical Shared Data Channel ("UL-PSDCH")
Broadband Pilot Channel ("BPICH")

For the purposes of explanation or various embodiments, the following terminology and abbreviations may be used herein:

AM Acknowledged Mode
AMD Acknowledged Mode Data
ARQ Automatic Repeat Request
BCCH Broadcast Control Channel
BCH Broadcast Channel
C- Control-
CCCH Common Control Channel
CCH Control Channel
CCTrCH Coded Composite Transport Channel
CP Cyclic Prefix
CRC Cyclic Redundancy Check
CTCH Common Traffic Channel
DCCH Dedicated Control Channel
DCH Dedicated Channel
DL Downlink
DSCH Downlink Shared Channel
DTCH Dedicated Traffic Channel
DCI Downlink Control Information
FACH Forward link Access Channel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS Point-to-Multipoint Control Channel
MRW Move Receiving Window
MSB Most Significant Bit
MSCH MBMS Point-to-Multipoint Scheduling Channel
MTCH MBMS Point-to-Multipoint Traffic Channel
PCCH Paging Control Channel
PCH Paging Channel
PDU Protocol Data Unit
PHY Physical Layer
PhyCH Physical Channels
RACH Random Access Channel
RLC Radio Link Control
RRC Radio Resource Control
SAP Service Access Point
SDU Service Data Unit
SHCCH Shared Channel Control Channel
SN Sequence Number
SUFI Super Field
TCH Traffic Channel
TDD Time Division Duplex
TFI Transport Format Indicator
TM Transparent Mode
TMD Transparent Mode Data
TTI Transmission Time Interval
U- User-
UE User Equipment
UL Uplink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multicast Broadcast Single Frequency Network
MCE MBMS Coordinating Entity
MCH Multicast Channel
DL-SCH Downlink Shared Channel
MSCH MBMS Control Channel
PDCCH Physical Downlink Control Channel
PDSCH Physical Downlink Shared channel
PCFICH Physical Control Format Indicator Channel It is appreciated that the word "exemplary" is used herein to mean "serving as an example, instance, or illustration". Any embodiment described herein as "exemplary" is not necessarily to be construed as preferred or advantageous over other embodiments.

Figure 1:
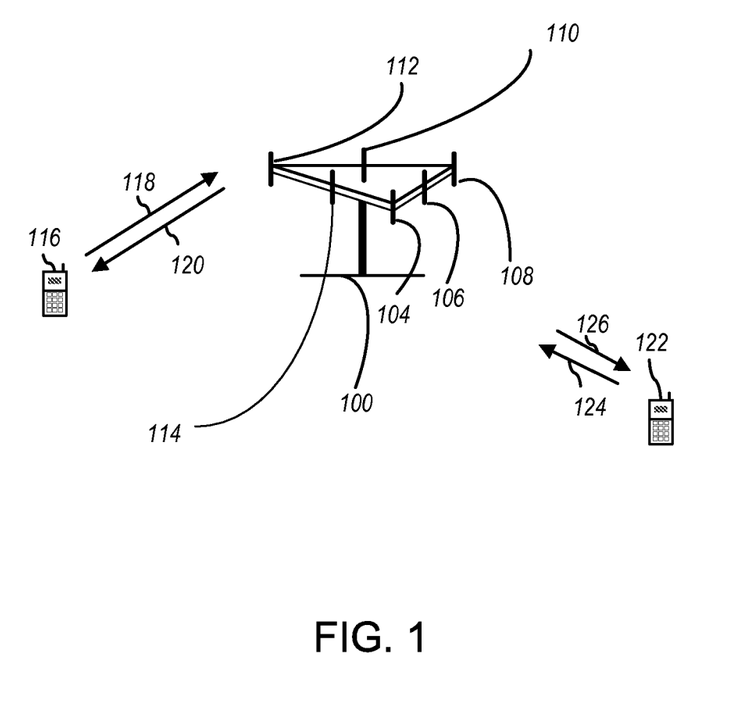
FIG. 1 illustrates a multiple access wireless communication system on which exemplary embodiments may be implemented.

Referring now to FIG. 1, a multiple access wireless communication system according to one exemplary embodiment is illustrated. In various implementations, an access point ("AP"), such as AP 100 of FIG. 1, may be a fixed station used for communicating with access terminals and may be referred to as an access point, a NodeB, an eNodeB, a home eNobeB ("HeNB"), or by other terminology. An access terminal ("AT"), such as AT 116 or AT 122 of FIG. 1, may be called an access terminal, a user equipment ("UE"), a wireless communication device, terminal, access terminal, or by other terminology. ATs 116 and 122 and UE 100 may be configured to implement various aspects of embodiments as are described herein.

An access point 100 includes multiple antenna groups, one including 104 and 106, another including 108 and 110, and an additional including 112 and 114. In FIG. 1, only two antennas are shown for each antenna group; however, more or fewer antennas may be utilized for each antenna group in various embodiments.

Access terminal 116 is in communication with antennas 112 and 114, where antennas 112 and 114 transmit information to AT 116 over forward link 120 and receive information from AT 116 over reverse link 118. Access terminal 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequencies for communication between AP 100 and ATs 116 and 122. For example, forward link 120 may use a frequency that is different than that used by reverse link 118. Likewise, links 124 and 126 may use different frequencies from each other and/or from links 118 and 120.

Each group of antennas and/or the area in which they are designed to communicate may be referred to as a sector of the access point. In the illustrated exemplary embodiment, antenna groups are each designed to communicate with access terminals in a designated sector of the area covered by access point 100. For example, the antenna group including antennas 112 and 114 may be assigned to a sector designated as Sector 1 in FIG. 1, while the antenna group including antennas 106 and 108 may be assigned to a sector designated as Sector 2.

In communication over forward links 120 and 126, the transmitting antennas of access point 100 may be configured to utilize beamforming in order to improve the signal-to-noise ratio of forward links for the different access terminals 116 and 122, as well as others (not shown). Also, in typical implementations, an access point using beamforming to transmit to access terminals scattered randomly throughout its coverage area may cause less interference to access terminals in neighboring cells than an access point transmitting through a single antenna to all its access terminals. It is appreciated that precoding of transmit signals may be used to facilitate beamforming.

Figure 2:
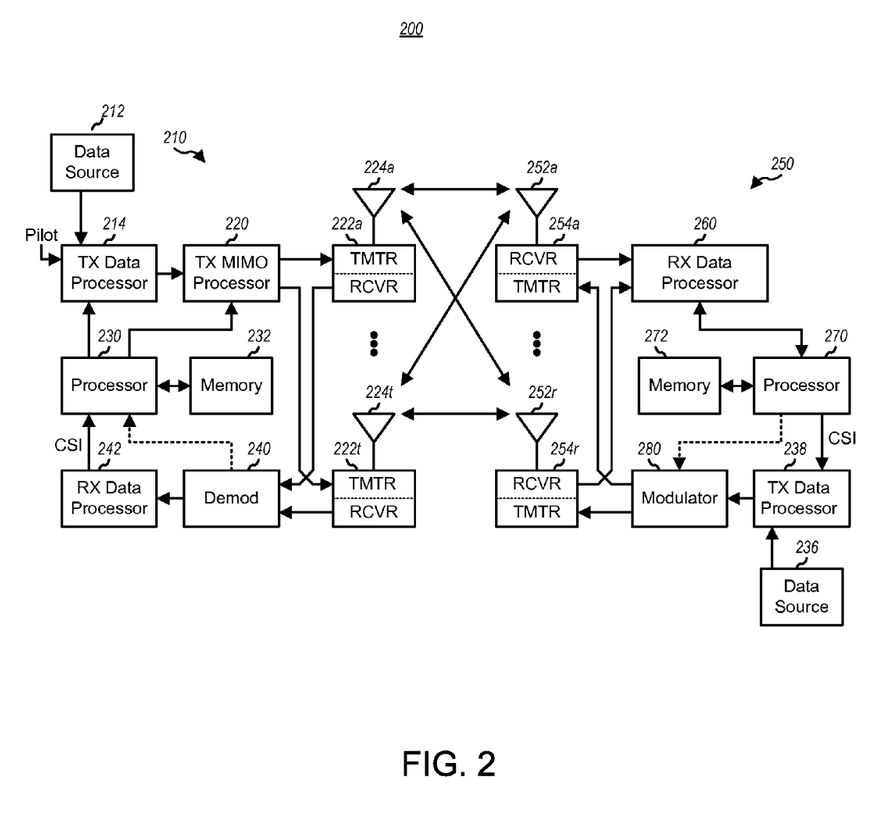
FIG. 2 illustrates a block diagram of an embodiment of a MIMO communication system.

Attention is now directed to FIG. 2, which illustrates a block diagram of an embodiment of a transmitter system 210 (i.e., an access point 210) and a receiver system 250 (i.e., an access terminal 250) in an exemplary MIMO system 200. It is appreciated that transmitter system 210 and receiver system 250 may correspond to AP 100 and ATs 116 and 122 of FIG. 1.

Generation and use of a user-specific reference signal ("UE-RS") as described herein may provide advantages in various MIMO system implementations. It is understood that no particular advantage is necessarily required in all embodiments disclosed herein. The UE-RSs may be generated in one or more modules of AP 210 for transmission to AT 250. AT 250 may include one or more modules to receive the UE-RSs to estimate channel characteristics and/or demodulate received data. This may be done in a reference signal selection module including one or more components (or other components not shown) of AP 210, such as processors 214, 230 and memory 232. AP 210 may also include a transmit module including one or more components (or other components not shown) of AP 210, such as transmit modules 224. AP 210 may also include a reference signal pattern generation module including one or more components (or other components not shown) of AP 210. Likewise, AT 250 may include a receive module including one or more components of AT 250 (or other components not shown), such as receivers 254. AT 250 may also include a channel estimation module including one or more components (or other components not shown) of AT 250, such as processors 260 and 270, and memory 272. Memories 232 and 272 may be used to store computer code for execution on one or more processors to implement processes as are described herein.

In operation, at the transmitter system 210, traffic data for a number of data streams may be provided from a data source 212 to a transmit ("TX") data processor 214, where it may be processed and transmitted to one or more receiver systems 250. In one embodiment, each data stream is processed and transmitted over a respective transmit antenna (e.g., antennas 224a-224t). TX data processor 214 receives, formats, codes, and interleaves the traffic data for each data stream based on a particular coding scheme selected for that data stream to provide coded data.

In particular, as described in more detail herein below, transmit system 210 may be configured to select a UE-RS pattern for different transmission ranks (i.e., the number of spatial transmission layers and the number of columns in the pre-coding matrix), and different channel and AT 250 conditions, such as channel time and frequency sensitivity, subframe format, and so on, and provide an efficient indication of the selected pattern and other UE-RS parameters for transmission in a downlink control channel. In certain embodiments, the efficient indication may be provided by a joint encoding of various UE-RS parameters.

The coded data for each data stream may be multiplexed with pilot data using OFDM techniques. The pilot data is typically a known data pattern that is processed in a known manner and may be used at the receiver system to estimate the channel response. The pilot data may be provided to TX data processor 214 as shown in FIG. 2 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.), selected for that data stream so as to provide modulation symbols. The data rate, coding, and modulation for each data stream may be determined by instructions performed by processor 230 based on instructions stored in memory 232, or in other memory or instruction storage media of transmit system 250 (not shown).

The modulation symbols for all data streams may then be provided to a TX MIMO processor 220, which may further process the modulation symbols (e.g., for OFDM). TX MIMO processor 220 may then provide Nt modulation symbol streams to Nt transmitters ("TMTR") 222a through 222t. In certain embodiments, TX MIMO processor 220 may apply beamforming weights to the symbols of the data streams and corresponding to the one or more antennas from which the symbol is being transmitted.

Each transmitter sub-system 222a through 222t receives and processes a respective symbol stream to provide one or more analog signals, and further conditions (e.g., amplifies, filters, and upconverts) the analog signals to provide a modulated signal suitable for transmission over the MIMO channel. Nt modulated signals from transmitters 222a through 222t are then transmitted from Nt antennas 224a through 224t, respectively.

At receiver system 250, the transmitted modulated signals are received by Nr antennas 252a through 252r and the received signal from each antenna 252 is provided to a respective receiver ("RCVR") 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the Nr received symbol streams from Nr receivers 254a through 254r based on a particular receiver processing technique so as to provide Nt "detected" symbol streams. The RX data processor 260 then demodulates, deinterleaves, and decodes each detected symbol stream to recover the traffic data for the data stream. The processing by RX data processor 260 is typically complementary to that performed by TX MIMO processor 220 and TX data processor 214 in transmitter system 210.

A processor 270 may periodically determine a pre-coding matrix. Processor 270 may then formulate a reverse link message that may comprise a matrix index portion and a rank value portion. In certain embodiments, the reverse link message may comprise various types of information regarding the communication link and/or the received data stream. The reverse link message may then be processed by a TX data processor 238, which may also receive traffic data for a number of data streams from a data source 236, which may then be modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

It is appreciated that a channel structure may be used that preserves low PAPR (e.g., at any given time, the channel is contiguous or uniformly spaced in frequency) properties of a single carrier waveform. It is also appreciated that the UE-RS may undergo the same precoding operation experienced by the data symbols.

In certain embodiments, the UE-RS pattern may be selected according to a transmission rank and different channel and UE conditions, such as channel time and frequency sensitivity, subframe format, and so on.

Figure 3:
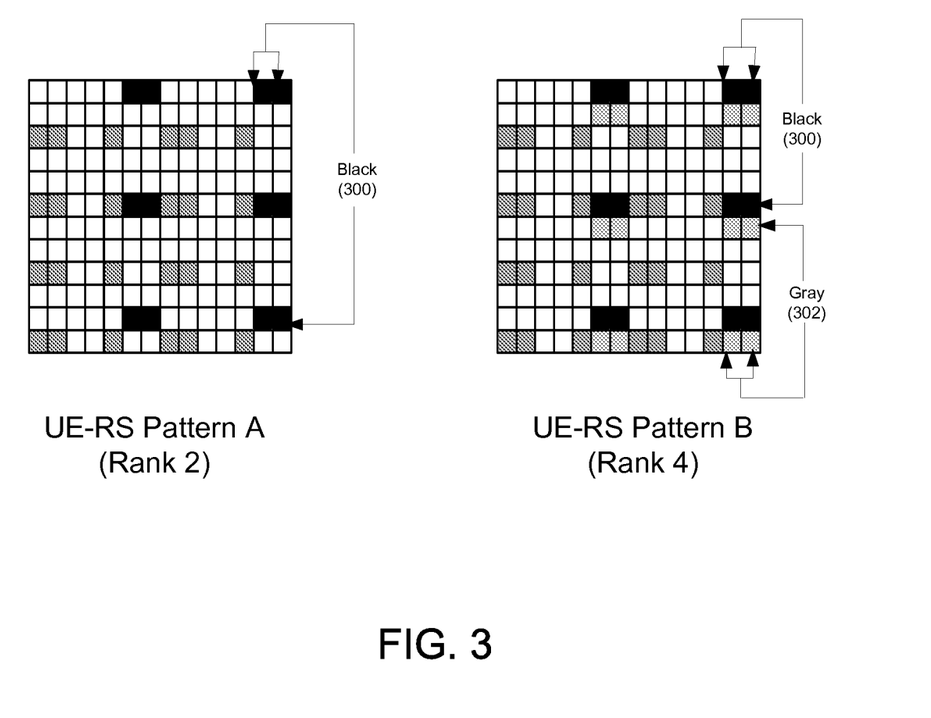
FIG. 3 illustrates exemplary patterns for a UE-RS.

FIG. 3 illustrates exemplary UE-RS patterns for up to four layers of transmission in LTE release 10 for normal cyclic prefix ("CP") subframes. Each square in FIG. 3 represents a resource element ("RE"), and each color shaded area represents a Code Division Multiplex ("CDM") group that multiplexes two UE-RS ports. For example, for a rank 2 transmission, two UE-RS ports are present in the black shaded REs multiplexed in CDM fashion. In another example, for a rank 4 transmission, four UE-RS ports are present, two in black shaded REs (300) and two in gray shaded REs (302).

In order for the UE to be able to carry out the demodulation and decoding of the data, the UE may need to at least know some UE-RS parameters, such as, for example: (1) the UE-RS pattern; (2) the UE-RS port locations; and (3) the UE-RS port to location mapping. Such information may enable the UE with knowing the REs used for data symbols, performing channel and interference estimation, among other procedures. As described below, these and other UE-RS parameters may be jointly encoded to save overhead when transmitting them in a downlink control channel.

Figure 4:
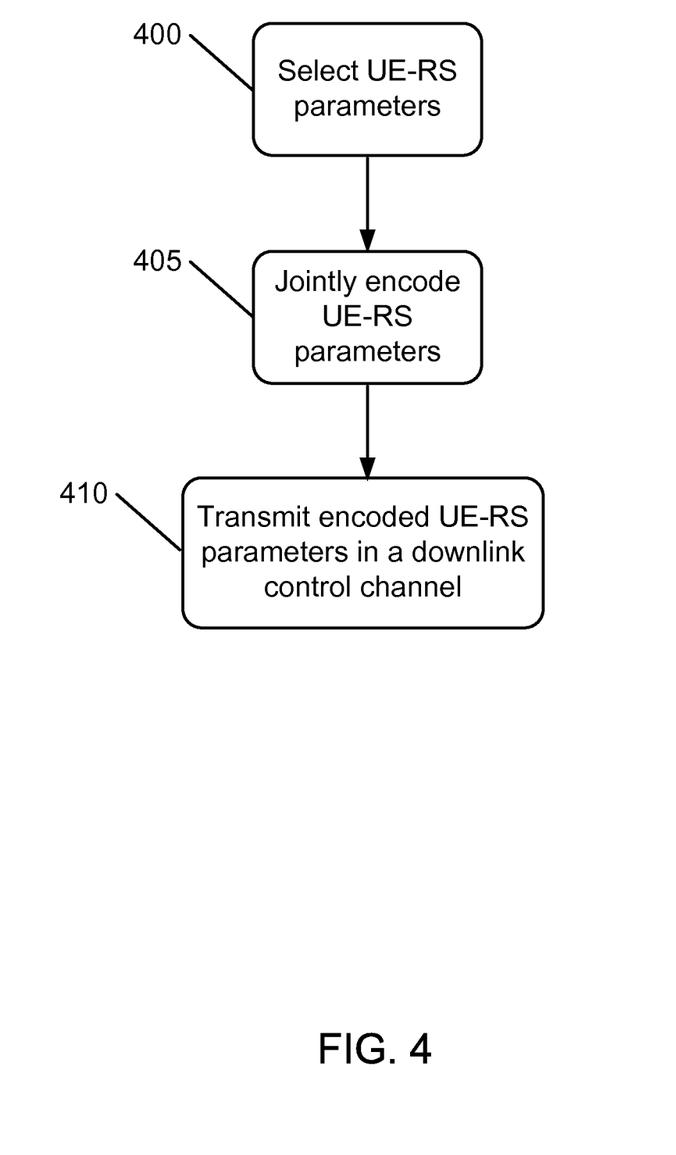
FIG. 4 illustrates a flowchart of a process to convey UE-RS parameters to a UE.

Referring now to FIG. 4, a flowchart that illustrates a process to convey UE-RS parameters to a UE is described. First, one or more UE-RS parameter(s) are selected (400). The selected parameters may include, for example, (1) the set of UE-RS antenna ports used for transmission to the UE; (2) the UE-RS pattern; (3) the rank of transmission; (4) UE-RS sequence initialization parameters such as the UE-RS sequence initialization ID; and (5) the total number of UE-RS ports assigned to all the UEs (e.g., in a MU-MIMO or cooperative MIMO across cells). For example, the rank of transmission may be selected followed by the UE-RS pattern to provide an indication of the selected rank and antenna ports. Further, information such as the total number of layers (including all the UEs) may also be included among the UE-RS parameters.

In certain embodiments, the knowledge of these parameters can be available through static, semi-static, and dynamic signaling, or a combination thereof. For example, in static signaling, the UE can rule out patterns beyond a particular rank based on the number of antenna ports signaled in the PBCH. In semi-static signaling, the UE can be signaled a subset of UE-RS antenna ports. The scheduler may then use antenna ports from this subset to transmit data to the UE. The sequence used for UE-RS transmission can also be indicated in a semi-static way. And in the case of dynamic signaling, the UE-RS pattern can be signaled through a DL grant.

It is appreciated that in designing the signaling mechanism, the flexibility of scheduling and the associated overhead may be considered. For example, legacy LTE Downlink Control Information ("DCI") provides control information regarding transmissions to the UE, such as the rank of transmission, precoding information, packet format, HARQ, and so on.

In certain embodiments, UE-RS parameters are jointly encoded (405) to the extent possible to save overhead in DL control signaling and to explore the redundancy that exists between the UE-RS parameters. For example, the UE-RS antenna ports used for transmission can indicate the rank of transmission. This redundancy can be used to reduce the overhead. After the UE-RS parameters are encoded, they are transmitted in a downlink control channel (410) and decoded at the UE. The UE then uses the derived UE-RS parameters and the transmitted UE-RS to demodulate and decode the transmitted data.

Figure 5:
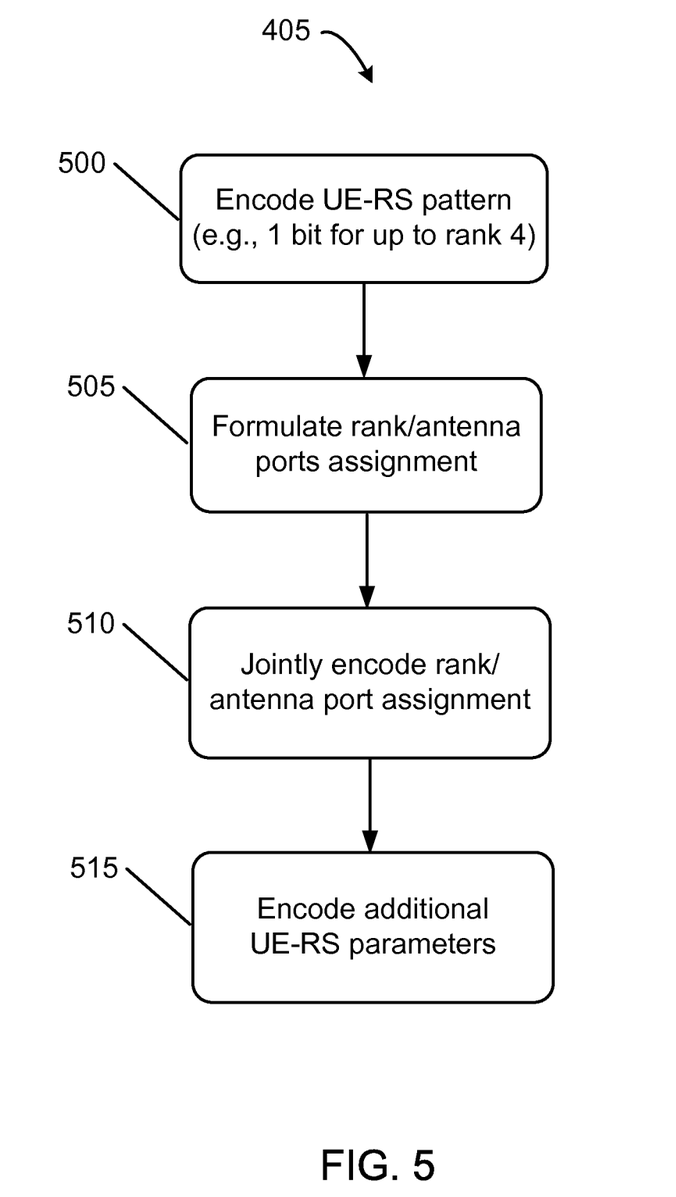
FIG. 5 illustrates a flowchart of an exemplary embodiment of joint encoding of UE-RS parameters.

FIG. 5 is a flowchart that illustrates an exemplary embodiment of the joint encoding of FIG. 4 (405) in more detail. First, the selected UE-RS pattern is encoded in a given number of bits, e.g., 1 bit for up to a rank 4 transmission (500). Next, an assignment is made between a given transmission rank and a set of antenna ports (505) by considering that some restrictions on the signaling do not affect the flexibility of the scheduler operation. For example, assuming that the UE-RS antenna ports have similar and symmetric properties (e.g., density, structure), a rank 3 transmission happening from the first three antenna ports or the last three antenna ports is identical. Therefore, restricting rank 3 transmissions to happen only from the first 3 UE-RS antenna ports can reduce the overhead in signaling without any performance and flexibility impact.

In one example, the rank of transmission may be indicated using independent bits from the UE-RS pattern and the UE-RS antenna ports bits. This is an extension of the LTE release 8 DCI format. For a system with operation up to rank 4 and two UE-RS patterns as shown in FIG. 3, 2 bits may be used to indicate the rank, 1 bit may be used to indicate which UE-RS pattern is used, and 4 bits may be used to indicate the UE-RS antenna ports, resulting in a total of 7 bits.

Considering this example, relying on the symmetric structure of the UE-RS ports in FIG. 3, one can ascertain that the UE-RS antenna port indices assigned to a UE may be consecutive (modulo the maximum number of UE-RS ports available in the UE-RS pattern). In this case, encoding this information may require an indication of the starting UE-RS port index and the rank of transmission. So for this example, 1 bit is needed to encode the UE-RS pattern, 2 bits are needed to encode the rank, and 2 bits are needed to encode the starting UE-RS antenna port, resulting in a total of 5 bits.

Alternatively, it is possible to formulate a joint assignment with an indication of the antenna port indices and rank information. In this case, the number of UE-RS ports used for a UE-RS determines the number of transmission layers (i.e., rank) to that UE. For example, indexing the antenna ports from 0, 1, 2, to N (the total number of ports that may be used), the following joint assignments of rank and antenna ports can be made:

TABLE 1

Joint Rank/Antenna Ports Assignments

| Rank | Antenna Ports | Encoding Assignments |
| --- | --- | --- |
| Rank 1 | {0}, {1}, {2}, or {3} | 4 rank/antenna ports assignments |
| Rank 2 | {0, 1} or {2, 3} | 2 rank/antenna ports assignments |
| Rank 3 | {0, 1, 2} | 1 rank/antenna ports assignments |
| Rank 4 | {0, 1, 2, 3, 4} | 1 rank/antenna ports assignments |

These eight rank and antenna ports assignments can therefore be jointly encoded in 3 bits (510). Given that one bit may also be used to indicate the UE-RS pattern, the total overhead is reduced to 4 bits. It is appreciated that additional UE-RS parameters may also be jointly encoded with the UE-RS antenna ports and rank and provided to the UE (515), such as, for example, the UE-RS pattern, the UE-RS sequence initialization ID parameters.

It is appreciated that in current LTE specifications, the antenna port value may also indicate the UE-RS pattern and UE-RS locations used as well as the UE-RS spreading sequence and scrambling sequence initialization ID used for transmission of UE-RS values corresponding to the antenna port.

It is also appreciated that a joint indication of the UE-RS pattern, rank and antenna ports may also be considered. For example, antenna ports {2,3} with rank 2 may not be used with UE-RS pattern A shown in FIG. 3. These restrictions can be further exploited in a joint encoding of the UE-RS pattern, rank, and antenna ports.

It is further appreciated that the examples given above for joint encoding of UE-RS parameters are for up to a rank 4 transmission; however, it is apparent that the same principles may work for higher ranks or different assumptions on the number of UE-RS patterns. Additionally, although the examples given are for dynamic signaling using a DL grant, it is appreciated that some aspects of this signaling can be done semi-statically and others can be done dynamically. This can be in fact useful for going to higher transmission ranks (e.g. beyond rank 4).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method that facilitates providing encoded information pertaining to a user-specific reference signal (UE-RS) associated with a user equipment (UE), the method comprising:
   including, within the encoded information, a bit sequence that encodes at least an indication of a transmission rank jointly with at least one parameter relating to the UE-RS, the at least one parameter relating to the UE-RS comprising a UE-RS sequence initialization ID; and
   transmitting the encoded information within a payload of a downlink control channel.

2. The method of claim 1, wherein the at least one parameter comprises an indication of antenna ports used for transmission of the UE-RS to the UE.

3. The method of claim 2, wherein the at least one parameter further comprises a time-frequency resource pattern characterizing the UE-RS.

4. The method of claim 3, wherein the at least one parameter further comprises a total number of UE-RS ports assigned to the UE.

5. The method of claim 2, wherein the bit sequence includes two (2) bits representative of the transmission rank and two (2) bits representative of a starting one of the antenna ports.

6. The method of claim 5, wherein the bit sequence further includes one (1) bit representative of a time-frequency resource pattern characterizing the UE-RS.

7. The method of claim 2, wherein the bit sequence includes a plurality of bits jointly representative of the transmission rank and the indication of antenna ports.

8. The method of claim 7, wherein up to four (4) antenna ports are used for transmission of the UE-RS.

9. The method of claim 8, wherein the plurality of bits includes three (3) bits indicating one of:
   the transmission rank is one (1) and that a particular one of the four (4) antenna ports is being used to transmit the UE-RS;
   the transmission rank is two (2) and that a particular two of the four (4) antenna ports are being used to transmit the UE-RS;
   the transmission rank is three (3) and that a particular three of the four (4) antenna ports are being used to transmit the UE-RS; and
   the transmission rank is four (4) and that each of the four (4) antenna ports is being used to transmit the UE-RS.

10. The method of claim 1, further comprising providing, within the encoded information, an indication of a UE-RS pattern.

11. A method for wireless communications, comprising:
receiving, on a downlink control channel, encoded information pertaining to a user-specific reference signal (UE-RS) associated with a user equipment (UE), wherein the encoded information includes a bit sequence that encodes at least an indication of a transmission rank jointly with at least one parameter relating to the UE-RS, the at least one parameter relating to the UE-RS comprising a UE-RS sequence initialization ID; and
decoding the encoded information.

12. The method of claim 11, wherein the at least one parameter comprises an indication of antenna ports used for transmission of the UE-RS to the UE.

13. The method of claim 12, wherein the at least one parameter further comprises a time-frequency resource pattern characterizing the UE-RS.

14. The method of claim 12, wherein the bit sequence includes a plurality of bits jointly representative of the transmission rank and the indication of antenna ports.

15. The method of claim 11, wherein the bit sequence includes one (1) bit representative of a time-frequency resource pattern characterizing the UE-RS.

16. The method of claim 11, further comprising determining, within the encoded information, an indication of a UE-RS pattern.

17. The method of claim 11, wherein the at least one parameter further comprises a total number of UE-RS ports assigned to the UE.

18. An apparatus for wireless communications, comprising:
means for selecting a user-specific reference signal (UE-RS) parameter;
means for jointly encoding the selected UE-RS parameter with at least one associated UE-RS parameter, the selected UE-RS parameter comprising a UE-RS sequence initialization ID; and
means for transmitting the jointly encoded UE-RS parameters in a downlink control channel to a user equipment (UE) associated with the UE-RS.

19. The apparatus of claim 18, wherein the selected UE-RS parameter comprises a rank of transmission.

20. The apparatus of claim 19, wherein the at least one associated UE-RS parameter comprises an indication of a set of antenna ports used for transmission of the UE-RS to the UE.

21. The apparatus of claim 20, wherein the means for jointly encoding comprises means for associating the rank of transmission to the set of antenna ports.

22. The apparatus of claim 21, wherein the means for associating comprises means for enumerating the antenna ports in the set of antenna ports with consecutive indexes.

23. The apparatus of claim 22, wherein the means for jointly encoding comprises means for providing a bit sequence that encodes an association between the rank of transmission and the set of antenna ports.

24. The apparatus of claim 23, wherein the bit sequence comprises a plurality of bits jointly representative of the transmission rank and the set of antenna ports.

25. The apparatus of claim 24, wherein the bit sequence further comprises a bit representative of a UE-RS pattern.

26. The apparatus of claim 20, wherein the rank of transmission corresponds to a cardinality of the set of antenna ports.

27. The apparatus of claim 20, wherein the at least one parameter further comprises a total number of UE-RS ports assigned to the UE.

28. The apparatus of claim 18, wherein the selected UE-RS parameter comprises a UE-RS pattern.

29. A computer program product for use in a wireless communication system, comprising:
a non-transitory computer-readable storage medium comprising:
instructions for causing at least one computer to select a rank of transmission;
instructions for causing the at least one computer to associate the selected rank of transmission with at least one parameter pertaining to a user-specific reference signal (UE-RS), the at least one parameter pertaining to the UE-RS comprising a UE-RS sequence initialization ID; and
instructions for causing the at least one computer to provide a joint indication of the rank and the at least one parameter to reduce overhead in a downlink control channel.

30. The computer program product of claim 29, wherein the computer-readable storage medium further comprises instructions for causing the at least one computer to select a UE-RS pattern.

31. The computer program product of claim 29, wherein the at least one parameter comprises a set of antenna ports enumerated with consecutive indexes.

32. The computer program product of claim 31, wherein the instructions for causing the at least one computer to provide the joint indication provides a bit sequence that encodes an association between the rank of transmission and the set of antenna ports.

33. The computer program product of claim 32, wherein the bit sequence comprises a plurality of bits jointly representative of the transmission rank and the set of antenna ports.

34. The computer program product of claim 33, wherein the bit sequence further comprises a bit representative of a UE-RS pattern characterizing the UE-RS.

35. The computer program product of claim 33, wherein the bit sequence further comprises a bit representative of the UE-RS pattern.

36. The computer program product of claim 33, wherein the bit sequence further comprises at least one bit representative of the UE-RS sequence initialization ID.

37. The computer program product of claim 31, wherein the at least one parameter further comprises a total number of UE-RS ports assigned to the UE.

38. An apparatus that facilitates providing encoded information pertaining to a user-specific reference signal (UE-RS) associated with a user equipment (UE), the apparatus comprising:
a processor configured to:
include, within the encoded information, a bit sequence that encodes at least an indication of a transmission rank jointly with at least one parameter relating to the UE-RS, the at least one parameter relating to the UE-RS comprising a UE-RS sequence initialization ID; and
transmit the encoded information within a payload of a downlink control channel.

39. The apparatus of claim 38, wherein the processor is further configured to include, within the encoded information, a bit representative of a UE-RS pattern.

40. An apparatus for wireless communications, comprising:
a processor configured to:
receive, on a downlink control channel, encoded information pertaining to a user-specific reference signal (UE-RS) associated with a user equipment (UE), wherein the encoded information includes a bit sequence that encodes at least an indication of a transmission rank jointly with at least one parameter relating to the UE-RS, the at least one parameter relating to the UE-RS comprising a UE-RS sequence initialization ID; and decode the encoded information.

41. The apparatus of claim 40, wherein the at least one parameter comprises one of:
an indication of antenna ports used for transmission of the UE-RS to the UE; and
a total number of UE-RS ports assigned to the UE.

42. An apparatus for wireless communications, comprising:
means for receiving, on a downlink control channel, encoded information pertaining to a user-specific reference signal (UE-RS) associated with a user equipment (UE),
wherein the encoded information includes a bit sequence that encodes at least an indication of a transmission rank jointly with at least one parameter relating to the UE-RS, the at least one parameter relating to the UE-RS comprising a UE-RS sequence initialization ID; and
means for decoding the encoded information.

43. The apparatus of claim 42, further comprising means for determining, within the encoded information, an indication of a UE-RS pattern.

44. The apparatus of claim 42, wherein the at least one parameter comprises one of:
an indication of antenna ports used for transmission of the UE-RS to the UE; and
a total number of UE-RS ports assigned to the UE.

45. A computer program product that facilitates providing encoded information pertaining to a user-specific reference signal (UE-RS) associated with a user equipment (UE), the computer program product comprising:
a non-transitory computer-readable storage medium comprising:
instructions for causing at least one computer to include, within the encoded information, a bit sequence that encodes at least an indication of a transmission rank jointly with at least one parameter relating to the UE-RS, the at least one parameter relating to the UE-RS comprising a UE-RS sequence initialization ID; and
instructions for causing the at least one computer to transmit the encoded information within a payload of a downlink control channel.

46. The computer program product of claim 45, wherein the computer-readable storage medium further comprises instructions for causing the at least one computer to select a UE-RS pattern.

47. The computer program product of claim 45, wherein the at least one parameter comprises a set of antenna ports enumerated with consecutive indexes.

48. The computer program product of claim 47, wherein the computer-readable storage medium further comprises instructions for causing the at least one computer to associate the rank of transmission with the set of antenna ports.

49. A method that facilitates providing encoded information pertaining to a user-specific reference signal (UE-RS) associated with a user equipment (UE), the method comprising:
selecting a rank of transmission;
associating the rank of transmission with at least one parameter pertaining to the UE-RS, the at least one parameter pertaining to the UE-RS comprising a UE-RS sequence initialization ID;
providing, subject to a set of scheduling constraints, a joint indication of the rank and the at least one parameter wherein the set of scheduling constraints are chosen to reduce overhead in a downlink control channel; and
transmitting the joint indication within the downlink control channel.

50. The method of claim 49, wherein the at least one parameter comprises a set of antenna ports used for transmission of the UE-RS to the UE.

51. The method of claim 50, wherein the providing comprises selecting a limited set of antenna ports for inclusion within the set of scheduling constraints.

52. The method of claim 51, wherein the at least one parameter further comprises a UE-RS pattern.

53. The method of claim 52, wherein the selecting is based on the rank of transmission and the UE-RS pattern.

54. The method of claim 53, wherein the selecting is further based on a maximum number of antenna ports supported by the UE.

55. The method of claim 53, wherein the selecting is further based on a maximum number of UEs capable of being multiplexed.

56. The method of claim 49, wherein the providing comprises selecting a transmission mode for inclusion within the set of scheduling constraints.

57. The method of claim 56, wherein the transmission mode comprises one of SU-MIMO, MU-MIMO, and Cooperative MIMO.

58. The method of claim 57, wherein the providing comprises limiting a number of layers assigned to the UE in at least one of MU-MIMO mode or Cooperative MIMO mode.

59. The method of claim 58, wherein the limiting comprises assigning one antenna port per rank of transmission.

60. The method of claim 49, further comprising performing scheduling decisions with respect to one or more other UEs based upon the set of scheduling constraints.

61. The method of claim 60, wherein the providing comprises selecting a UE-RS pattern and the at least one parameter based on the scheduling decisions.

62. The method of claim 49, wherein the providing comprises selecting the set of scheduling constraints to guide channel and interference estimation and demodulation.

63. An apparatus that facilitates providing encoded information pertaining to a user-specific reference signal (UE-RS) associated with a user equipment (UE), the apparatus comprising:
means for selecting a rank of transmission;
means for associating the rank of transmission with at least one parameter pertaining to the UE-RS, the at least one parameter pertaining to the UE-RS comprising a UE-RS sequence initialization ID;
means for providing, subject to a set of scheduling constraints, a joint indication of the rank and the at least one parameter wherein the set of scheduling constraints are chosen to reduce overhead in a downlink control channel; and
means for transmitting the joint indication within the downlink control channel.

64. The apparatus of claim 63, further comprising means for performing scheduling decisions with respect to one or more other UEs based upon the set of scheduling constraints.

* * * * *